UNITED STATES PATENT OFFICE.

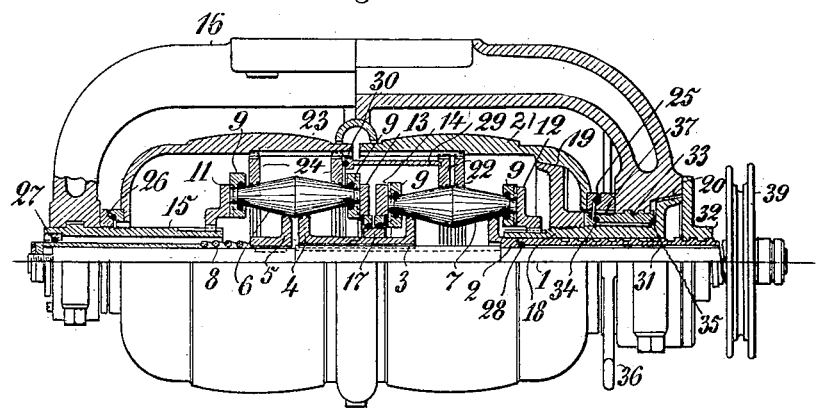
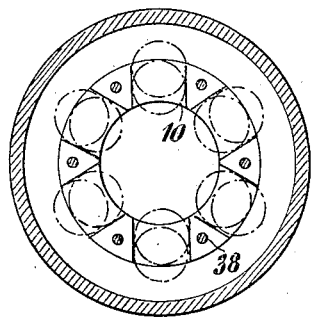
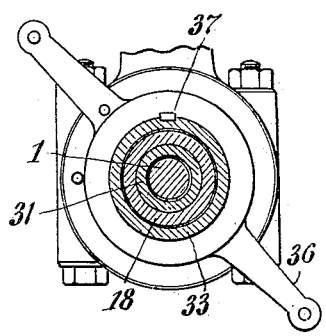

JENS CHRISTIAN MARTINS, OF COPENHAGEN, DENMARK, ASSIGNOR TO TRANSMISSION AKTS., OF COPENHAGEN, DENMARK.

VARIABLE-SPEED GEAR.

1,112,710. Specification of Letters Patent. Patented Oct. 6, 1914.

Application filed August 25, 1913. Serial No. 786,517.

*To all whom it may concern:*

Be it known that I, JENS CHRISTIAN MARTINS, a subject of the King of Denmark, residing at Amagerbrogade 102, Copenhagen, Denmark, have invented certain new and useful Improvements in Variable-Speed Gears, of which the following is a full, clear, and exact description.

This invention relates to variable speed gears, and particularly to the type in which a set of double conical bodies, acting as planetary wheels, engage and roll on one side on the circumference of flanges or disks non-rotatably fixed on a shaft, and on the other side engage and roll upon the inner edge of rings keyed to the respective pulleys. Now according to the present invention such variable speed gears are constructed in such a manner that the planet carrier of one system can be released, whereby the apparatus can run idly, or can be coupled to one of the pulleys of the apparatus, whereby the direction of rotation is reversed.

The invention will now be more fully described with reference to the accompanying drawing, in which:

Figure 1 shows a modification of a gearing according to the invention, partially in longitudinal section. Fig. 2 shows a planet carrier, and Fig. 3 an operating lever.

The shaft 1 carries the flanges 2, 3, 4, 5, 3 and 4 of which flanges are connected so as to form one body while all of them by tongue and groove connection are forced to follow the revolutions of the shaft. All of the flanges are through the double conical bodies 6 and 7 acted upon by the pressure of the spring 8, so that all of them are forced to rest against these planetary bodies. These latter are journaled in ball bearings 9, which are guided in slots 10 in the rings 11, 12, 13, 14 forming the planet carrier, one of which rings is shown separately in Fig. 2. The ring 11 is by means of groove and tongue connection non-rotatably arranged on the part 15 and thereby to the fixed frame 16. The rings 13 and 14 rest on the ball bearing 17, and finally the ring 12 is by tongue and groove connection made to follow the revolution of the sleeve 18, which by the conical clutch members 19 and 20 in the manner described hereinafter can be secured either to the casing 21, and thus to the outer rings 22, or through the fixed frame 16. The casings or pulleys 21 and 23 rest partly on the outer rings 22 and 24 and partly on ball bearings 25 and 26. The shaft 1 with its associated parts are journaled in ball bearings 27 and 28. The rings 22 and 24 are kept at a constant distance from each other by the cylindrical body 29 and the row of balls 30. One part of the ball bearings 28, is, as shown, formed by the boss of the flange 2, and the other part is formed by the externally screw threaded sleeve 31, and this latter can by turning the chain wheel 39, be screwed forward and backward in the flange 32, fixed on the fixed frame 16. The sleeve 18 is journaled in ball bearings 34 and 35, the cups of which are formed by the sleeve 33 which sleeve is externally screw threaded and can be somewhat displaced by rotating it. This rotation can be effected by means of a lever 36 (see Fig. 3). The boss of the lever forms the cone of the ball bearing 25 and is connected with the sleeve 33, through groove and tongue connection 37. As shown in the drawing there are two planet carriers consisting of rings 11 and 13 and 12 and 14, respectively. These rings are connected in pairs by bolts arranged between the double conical bodies in holes 38, Fig. 2.

The apparatus described acts in the following manner: If by turning the lever 36 and thereby the sleeve 33 the clutch member 20 is displaced until the sleeve 18 is fixed, the planet carrier formed by the rings 12 and 14 becomes non-rotatable, and the apparatus will then act in such a manner, that the power which is led to the pulley 23 is transmitted from the same through the double conical bodies 6 to the shaft 1, and therefrom to the pulley 21. Through transmission of the motion from the pulley to the shaft the direction of rotation is altered, the two pulleys will rotate in the same direction, and the resulting ratio of gearing is equal to the product of the separate ratios of gearing between the pulley 23 and the shaft, and between the latter and the pulley 21, and thus the resulting ratio of gearing may become very great.

In the position of the flanges shown in Fig. 1 the greatest possible ratio of gearing is obtained, it being presumed that the sleeve 18 is by means of the clutch member 20 coupled to the fixed frame 16, the bodies 6 rolling with their smallest diameters on the rings 24 and with their greatest diameters on the flanges 4 and 5; while the bodies 7 roll with their smallest diameters on the flanges 2 and 3, and with their greatest diameters on the rings 22.

If the ratio of gearing is to be altered the chain wheel 39 and thereby the sleeve 31 is turned, which sleeve is thereby screwed out of or into the casing 21. The flange 2 is thereby displaced, whereupon the double conical bodies 7 are forced outward, and the rings 22 will be forced from each other. Owing to the cylindrical body 29 the rings 24 will be brought near to each other and the double conical bodies 6 forced down between the flanges 4 and 5, the flange 5 being displaced to the left the same distance as the flange 2, both of them following the movement of the shaft 1. The planet carriers are connected through the ball bearing 17, which is possible because they are always displaced to the same extent and to the same side.

By the displacement effected the bodies 6 have been caused, to roll on the rings 24 with greater diameter than previously on the flanges 4 and 5 with a smaller diameter. The bodies 7 roll at same time with a greater diameter on the flanges 2 and 3 and with a smaller diameter on the rings 22. This infers that the ratio of gearing obtained has become less than in the above named case. If now by turning the lever 36 the sleeve 33 is screwed to the right, the clutch member 20 will be released while the clutch member 19 will come into engagement with the casing 21, and the planet carrier consisting of the rings 12 and 14 will be coupled to the casing 21, so that no rolling can take place between the double conical bodies 7 and the rings 22, and thus no rolling either on the flanges 2 and 3. The entire system is coupled together into one body which follows the revolution of the shaft 1. The direction of rotation being reversed through transmission from the flanges to the outer rings, the pulleys 23 and 21 will now turn in the opposite direction. If the lever 36 is placed in such a position that none of the conical clutch members are in engagement, the planet carrier consisting of the rings 12 and 14 can freely rotate, and no motion is transmitted to the rings 22 or, to the pulley 21, thus idle running takes place.

Having now particularly described and ascertained the nature of the said invention what I claim and desire to secure by Letters Patent of U. S. of America is:

1. Variable speed friction-gearing, comprising a fixed frame, a shaft, flanges displaceably but non-rotatably fixed thereon, two pulleys, rings connected with said pulleys, two planet-carriers one of which is non-rotatably connected with said fixed frame, two sets of double conical bodies adapted to roll between the circumference of said flanges and the inner surfaces of said rings, and means by which the other of said planet-carriers can be coupled to said fixed frame, to one of said pulleys, or be totally uncoupled.

2. Variable speed-friction gearing, comprising a fixed frame, a shaft, flanges displaceably but non-rotatably fixed thereon, two pulleys, rings connected with said pulleys, two planet carriers one of which is non-rotatably connected with said fixed frame, two sets of double conical bodies adapted to roll between the circumference of said flanges and the inner surfaces of said rings, a sleeve non-rotatably connected with the other of said planet-carriers, and clutch-members on said sleeve adapted to coact with corresponding clutch-members on said fixed frame and on one of said pulleys respectively.

In testimony whereof I affixed my signature in presence of two witnesses.

JENS CHRISTIAN MARTINS.

Witnesses:
  E. FREDERIKSEN,
  VIGGO BLOM.

---

Copies of this patent may be obtained for five cents each, by addressing the "Commissioner of Patents, Washington, D. C."